Patented Oct. 6, 1925.

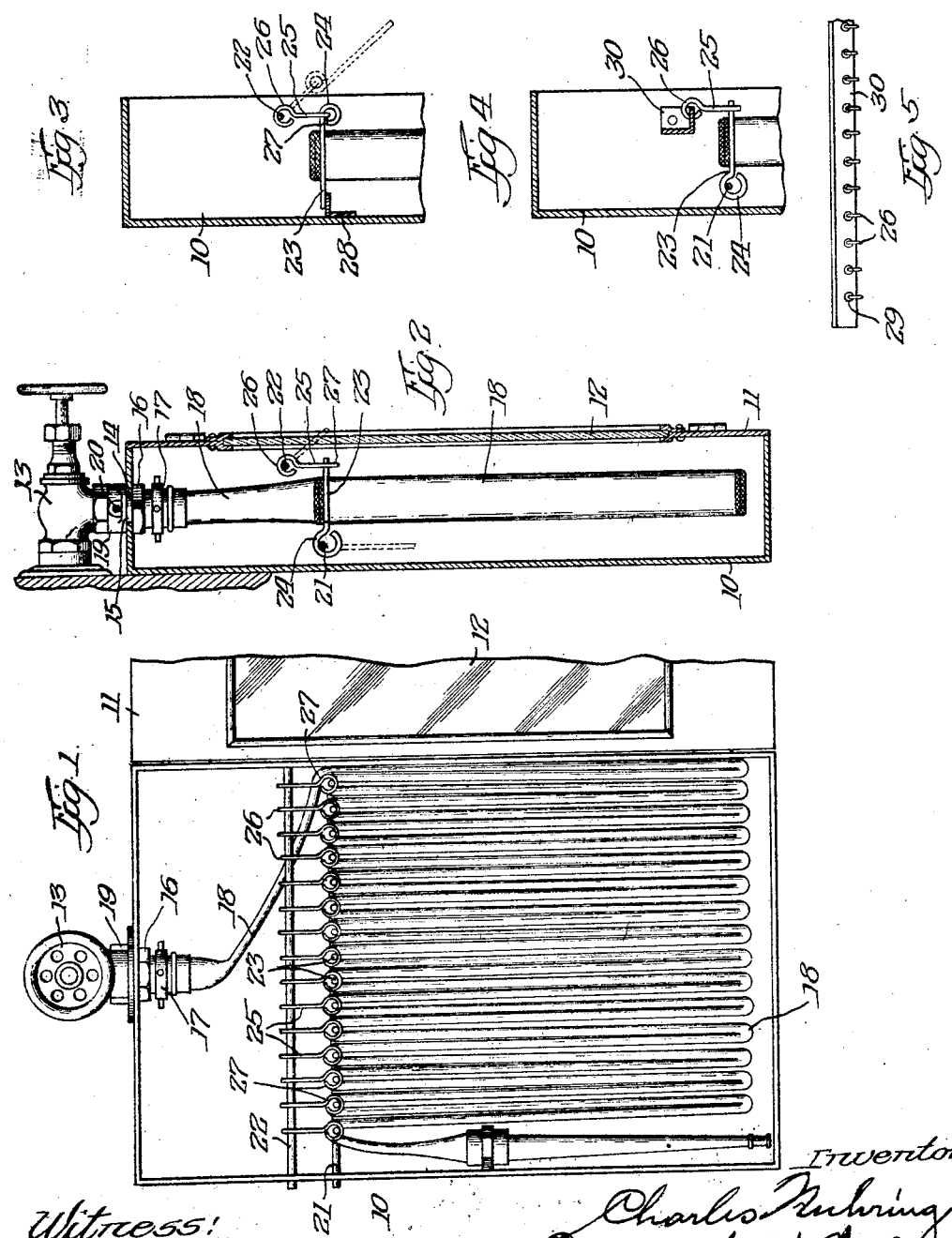

1,556,123

UNITED STATES PATENT OFFICE.

CHARLES NUHRING, OF CINCINNATI, OHIO.

COMBINED HOSE RACK AND CABINET.

Application filed March 20, 1922. Serial No. 545,381.

*To all whom it may concern:*

Be it known that I, CHARLES NUHRING, a citizen of the United States, residing at Cincinnati, Hamilton County, State of Ohio, have invented certain new and useful Improvements in Combined Hose Racks and Cabinets, of which the following is a specification.

Various expedients for storing hose have been devised. Both racks and reels are utilized for this purpose. These devices are employed with and without cabinets. Varying constructions of cabinets also have been used. But whether a rack, a reel or a cabinet, the instrumentality adopted has been open usually to the objection that access to the hose to pay it out for use has been difficult. When comparatively easy of such access, the storage device usually has been of such construction that replacement of the hose could be effected only with great inconvenience.

To overcome the foregoing objections is the primary object of the present invention. It combines the advantages of a rack and a cabinet. It affords protection against deterioration of the hose by suspending the latter in pendent loops to permit free circulation of air about the loops, and it guards against the ravages of dust and dirt accumulations by housing the hose in a cabinet. It supplements these advantages by novel supporting mechanism designed to obtain maximum efficiency both in removal of the hose for use, and replacement of the hose to the supporting mechanism after use. In the accomplishment of this provision is made for expeditious shedding of the pendent loops, and ready withdrawal of the hose from the cabinet without liability to fouling, and the replacement of the hose is effected with equal facility and ease. This is assured by retention of the hose supports within the cabinet and preservation of their assembled relation therein notwithstanding their changed status with respect to the position they assume when supporting the hose.

Other objects and advantages of the invention will become apparent as the nature of the improvements is better understood, the invention consisting substantially in the novel construction, combination and arrangement of parts hereinafter fully described, illustrated in the accompanying drawings, and finally pointed out in the appended claims.

It will be understood that the several forms of the invention made the basis of the present disclosure are simply adaptations of the invention to practical purposes and exemplify the use of the invention in a general way. The disclosure, therefore, is to be considered from an illustrative standpoint, it being understood that the concept of the invention is not to be limited by such embodiments thereof as are herein relied on.

In the drawings—

Figure 1 is a front elevation of a combined hose rack and cabinet constructed in accordance with the present invention, the same being shown with the door of the cabinet open, and a length of hose stored within the cabinet.

Figure 2 is a vertical transverse sectional view thereof, the dotted lines indicating movement of the supporting mechanism as the loops of hose are shed from the rack.

Figure 3 and Figure 4 are fragmentary sectional views, similar to Figure 2, illustrating other forms of the supporting mechanism.

Figure 5 is a plan view of the supporting bar for the suspension devices employed in the form illustrated in Figure 4.

Referring now in detail to the accompanying drawings, the numeral 10 designates a cabinet which is substantially rectangular in form, of sufficient dimensions to house the hose, and open at its face to provide access to the interior thereof. To one side of the open face of the cabinet 10 is hinged a door 11, preferably provided with a glass panel 12 through which the interior of the cabinet may be viewed. The numeral 13 designates an angle valve leading from a source of water supply, such as a standpipe, and this standpipe may or may not be enclosed in the masonry or partitions of the building with which the rack and cabinet herein described is employed. As illustrated, the cabinet 10 is suspended from the valve 13, and thus is exposed. However, in accordance with the prevailing practice in the construction of buildings, the cabinet 10 may be set into a recess in the wall, so that its face will be flush with the wall, thereby concealing the cabinet. It is immaterial whether the valve 13 be within or without the cabinet 10. If the latter be set into the wall said valve will be arranged within the cabinet, and so disposed with respect to the latter that it will connect with the water supply pipe through one of the walls of the cabinet. If used as illustrated, the top of the cabinet has an opening 14 formed therein, and through said opening is passed a nipple 15 screwed into the body of the valve 13, and extending into the interior of the cabinet. At this point the nipple 15 is surrounded by a clamping collar 16 below which the coupling 17 of the hose 18 is connected to the depending end of the nipple. At the exterior of the cabinet, and likewise surrounding the nipple 15, is a flanged sleeve 19, which sleeve is mounted on the nipple 15 and held against rotation by a set screw 20. With the parts related as above described, it will be observed that the top of the cabinet is clamped between the sleeve 19 and the collar 16, and thus maintained properly suspended from the nipple 15.

Referring more particularly to Figures 1 and 2, it will be noted that the cabinet 10 is provided at its interior, and adjacent to its upper portion, with a pair of parallel supporting rods 21 and 22. These rods are arranged in different horizontal planes, the rod 21 being in the lower plane and the rod 22 in the upper plane. The distance between the rods, transversely of the cabinet 10, is sufficient to accommodate the width of the hose 18, and thus to permit the hose readily to be passed between the rods from the valve 13.

Slidably mounted on the lower supporting rod 21 is a plurality of hose supporting pins 23, each of which is provided with an eye 24 through which the rod 21 is passed. The eyes 24 afford pivotal connections between the pins 23 and the rod 21, and said pins, therefore, are capable of free swinging movement on the rod 21. The supporting position of the pins 23 is shown by full lines in Figure 2, while the non-supporting position thereof is illustrated by dotted lines therein. Each one of the pins 23 is designed to support a pendent loop of the hose 18, as clearly illustrated at Figure 1, and they are spaced sufficiently apart with respect to each other to permit free circulation of the air in and about such pendent loops in order to protect the loops against deterioration.

To hold the pins 23 in supporting position each is provided with an independent suspensory device 25 in the form of a latch member. These suspensory devices 25 are each provided with an upper eye 26 and a lower eye 27, said eyes being disposed at right angles to each other. The upper eyes 26 receive the upper supporting rod 22 and afford pivotal connections between the suspensory devices 25 and said supporting rod 22 which enable the suspensory devices 25 freely to swing on the rod 22. The lower eyes 27 receive the free ends of the hose supporting pins 23, and the length of the devices 25 is such that when the free ends of the pins 23 occupy the eyes 27 and rest therein said pins 23 are horizontal. This is the supporting position of the pins 23. By reason of the angular relation of the eyes 26 and 27 of the suspensory devices, the latter may swing clear of the free ends of the supporting pins 23 when outward pressure or pull is exerted on the devices 25, this arising when the pendant loops of the hose are drawn outwardly from the cabinet 10 as required for use. In this movement the suspensory devices 25 swing outwardly independently and in regular succession, thereby withdrawing their support from the free ends of the pins 23, whereupon the latter, under the weight of the pendent loops, swing downwardly to the dotted line position illustrated in Figure 2, and successively shed themselves of the several loops supported thereby. In this connection it will be observed that the positioning of the supporting rods 21 and 22 in different horizontal planes is of importance in order properly to relate the suspensory devices 25 to the supporting pins 23 in the supporting positions of the latter, and when the pins 23 are engaged with the suspensory devices 25 there is an interlocking relation established between these elements, but capable of ready disengagement upon outward pull of the hose.

The pins 23 function as rack members for support of the hose; the rod 21 constitutes rack supporting means for one end of said pins, and the rod 22 with the suspensory devices 25 constitute supporting means for the other ends of the pins 23.

In Figure 3 is illustrated another form of the invention. It includes the upper supporting bar 22 and the several suspensory devices 25 carried thereby. In this form, however, the eyes 24 of the hose supporting pins 23 are connected to the lower eyes 27 of the suspensory devices to articulate these members with respect to each other. In lieu of employing the lower supporting rods 21 of the form previously described, a supporting ledge 28 is arranged on the back wall of the cabinet 10, said ledge being formed of angle iron, and the free ends of the supporting pins 23 rest upon said ledge 28, thus maintaining said pins in supporting position. In the outward movement of the hose, the pull or pressure exerted thereon causes the several pins 23 and the suspensory devices 25 to which they are connected to move away from the ledge 28, and to the position substantially outlined by dotted lines in Figure 3, and when the ends of the pins 23 have cleared the ledge 28 each pin sheds the loop supported thereby to permit that loop to gravitate and pass out of the cabinet 10.

Figure 4 illustrates another form of the invention. In this form the lower supporting rod 21 is retained, together with the supporting pins 23 pivoted thereto by their eyes 24. The suspensory devices 25 engage the free ends of the pins 23 to hold them in horizontal supporting position, but the upper eye 26 of each of said devices 25 engages a single opening 29 formed in a supporting bar 30, which bar preferably is of angle iron formation, the openings 29 being formed in one flange of said bar and arranged therein at properly spaced intervals. The suspensory devices 25 associated with the bar 30 are always maintained at uniform distances apart, due to the openings 29, and have no relative movement towards or away from each other as is characteristic of the devices 25 associated with the bars 22 of the other two forms.

In the use of the herein described rack, and with particular reference to the forms shown in Figures 1 and 2, and 4 and 5, each pin 23 supports a pendent loop. When the hose is required to be removed from the cabinet the nozzle thereof is grasped and outward pull exerted thereon. This draws the first loop against the suspensory device 25 of the supporting pin 23 on which the loop is mounted, and continued pull swings the suspensory device outwardly, thereby releasing the free end of the pin 23. The latter immediately swings downwardly. The outward pull on the next loop of the hose likewise swings outwardly the suspensory device with which the supporting pin of that loop is engaged, and this pin thereupon swings downwardly, thus shedding itself of the loop. This continues in regular succession across the entire dimension of the cabinet until each pin has shed itself of the particular loop suspended therefrom. Obviously, the pull on the hose is but slight for the purpose referred to, and minimum strength only is required to release the hose from the cabinet. After use of the hose has been made the same readily may be replaced within the cabinet, being trained over the several pins in regular succession, each pin being engaged with its individual suspensory device on formation of the loop. The fact that both the pins and the suspensory devices are held by their respective supports retains the pins and the suspensory devices within the cabinet, and they are readily accessible for proper engagement on replacing of the hose.

In the use of the form shown in Figure 3, outward pull on the hose moves the respective loops against the suspensory devices 25, and these swing upon the support 22 to which they are pivoted. In such swinging movement the pins 23 are pulled outwardly until their ends move away from the supporting ledge 28, whereupon the pins swing downwardly and each sheds itself of the loop which it carries.

I claim:

1. In a hose supporting device, the combination with a plurality of pivotally mounted hose supporting elements adapted for supporting hose in pendent loops, of a pivoted support for each of said supporting elements engageable with the latter and successively releasable from the supporting elements under pressure exerted on the supports when withdrawing the hose from said supporting elements.

2. In a hose supporting device, the combination with a plurality of pivotally mounted hose supporting elements adapted for supporting hose in pendent loops, of a plurality of pivoted supports for said supporting elements engageable with the latter and releasable therefrom under pressure exerted thereon when withdrawing the hose from said supporting elements, said pivoted supports occupying a different horizontal plane from the hose supporting elements to sustain the latter in horizontal position when supporting the hose.

3. In a hose supporting device, the combination with a plurality of pivotally mounted hose supporting elements adapted for supporting hose in pendent loops, of a plurality of pivoted supports for said supporting elements the pivots of which are arranged in a higher plane than the pivots of said hose supporting elements, said supports being engageable with the hose supporting elements and releasable therefrom under pressure exerted thereon when withdrawing the hose from said supporting elements.

4. In a hose supporting device, the combination with a plurality of pivotally mounted hose supporting elements adapted for supporting hose in pendent loops and movable downwardly to shed said loops therefrom, of a pivoted suspensory device engageable with each of said supporting elements and successively releasable from the supporting element under pressure exerted on the supports when withdrawing the hose from said supporting elements.

5. In a hose supporting device, the combination with a plurality of pivotally mounted hose supporting elements adapted for supporting hose in pendent loops and movable downwardly to shed said loops therefrom, the supporting position of said elements being horizontal, of a plurality of pivoted suspensory devices suspended from a point above the pivotal points of said supporting elements, said suspensory devices being engageable with said supporting elements in the horizontal position of the latter and releasable therefrom under pressure exerted thereon when withdrawing the hose from said supporting elements.

6. In a hose supporting device, the combination with a plurality of pivotally mounted hose supporting elements adapted for supporting hose in pendent loops and movable downwardly to shed said loops therefrom, the supporting position of said elements being horizontal, of a plurality of vertically disposed suspensory devices pivoted at a point above the pivotal points of said supporting elements, said suspensory devices being engageable at their lower ends with said supporting elements in the horizontal position of the latter, pressure exerted on said suspensory devices when withdrawing the hose from said supports serving to release the latter and permit shedding of the hose from the supporting elements.

7. In a combined hose rack and cabinet, the combination with a cabinet, of parallel supports therein, a plurality of hose supporting elements pivotally connected to one of said supports, suspensory devices pivotally connected to the other of said supports, the respective suspensory devices being engageable with corresponding supporting elements and successively releasable therefrom under pressure exerted on the suspensory devices when withdrawing the hose from said supporting elements.

8. In a combined hose rack and cabinet, the combination with a cabinet, of parallel supports therein, a plurality of hose supporting elements pivotally connected to one of said supports and movable downwardly therefrom for shedding the hose supported thereby, a plurality of suspensory devices pivotally connected to the other of said supports and movable outwardly therefrom, the respective suspensory devices being engageable with corresponding supporting elements and successively releasable from the latter under pressure exerted on the suspensory devices when withdrawing the hose from said supporting elements.

9. In a combined hose rack and cabinet, the combination with a cabinet, of a plurality of pivoted hose supports mounted therein, and means for supporting the free ends of said hose supports, said supporting means being displaceable in a direction laterally of the rack to free the supports from engagement with the hose and shed the hose from the supports in a direction laterally of the rack.

10. In a combined hose rack and cabinet, the combination with a cabinet, of a plurality of pivoted hose supports mounted therein, means for supporting the free ends of said hose supports and maintaining the latter horizontal, and means cooperating with said hose supports and displaceable in a direction laterally of the rack to release the hose from the supports, whereby to shed the hose from the supports in a direction laterally of the rack.

11. In a combined hose rack and cabinet, the combination with a cabinet, of a plurality of hose supports pivotally mounted therein at one of their ends, and means engageable with said supports at their other ends for supporting and maintaining the supports horizontal, the last mentioned means being displaceable in a direction laterally of the rack to release the hose from the supports, whereby to shed the hose from the supports in a direction laterally of the rack.

12. In a hose supporting device, a plurality of elements for supporting hose in pendent loops, and supporting means located at both ends of each of said elements, the supporting means at one end of each element being displaceable longitudinally of the element upon movement of the hose against the last-mentioned supporting means whereby to shed the loops of the hose laterally of the device.

In testimony whereof I have hereunto signed my name.

CHARLES NUHRING.